(12) United States Patent
Jeong

(10) Patent No.: US 9,667,869 B2
(45) Date of Patent: May 30, 2017

(54) CAMERA APPARATUS FOR AUTOMATICALLY MAINTAINING HORIZONTALITY AND METHOD FOR THE SAME

(71) Applicant: ELECTRONICS AND TELECOMMUNICATIONS RESEARCH INSTITUTE, Daejeon (KR)

(72) Inventor: Young-Sic Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/993,244

(22) Filed: Jan. 12, 2016

(65) Prior Publication Data
US 2016/0212313 A1 Jul. 21, 2016

(30) Foreign Application Priority Data
Jan. 16, 2015 (KR) .................. 10-2015-0007877
Jan. 16, 2015 (KR) .................. 10-2015-0007878
Oct. 15, 2015 (KR) .................. 10-2015-0143780

(51) Int. Cl.
*H04N 5/235* (2006.01)
*H04N 5/232* (2006.01)
(Continued)

(52) U.S. Cl.
CPC ....... *H04N 5/23258* (2013.01); *H04N 5/2257* (2013.01); *H04N 5/2259* (2013.01); *H04N 5/23287* (2013.01)

(58) Field of Classification Search
CPC .............. H04N 5/2257; H04N 5/2259; H04N 5/23258; H04N 5/23287
See application file for complete search history.

(56) References Cited

U.S. PATENT DOCUMENTS 6,477,329 B2* 11/2002 Weng ................... H04N 5/2259
348/333.06
2010/0265349 A1 10/2010 Kim et al.
(Continued)

FOREIGN PATENT DOCUMENTS

| KR | 10-2006-0081116 | 7/2006 |
| KR | 10-2006-0081889 | 7/2006 |
| KR | 10-2012-0008806 | 2/2012 |

*Primary Examiner* — Dennis Hogue
*Assistant Examiner* — John H Morehead, III
(74) *Attorney, Agent, or Firm* — Kile Park Reed & Houtteman PLLC

(57) ABSTRACT

Disclosed herein is a camera apparatus for automatically maintaining horizontality and a method for maintaining the horizontality of a camera module and an image sensor. Particularly, the method for maintaining the horizontality of the camera module and the image sensor according to an embodiment of the present invention include: a step in which a horizontal sensor senses the horizontal state of the image sensor; a step in which a horizontal control signal generation unit generates a horizontal control signal based on a result of comparing the horizontal state with a reference state; and a step in which a horizontal control device rotates any one of the camera module and the image sensor to attain horizontality based on the horizontal control signal and controls any one of the camera module and the image sensor to stay horizontal.

20 Claims, 10 Drawing Sheets

(51) Int. Cl.
*H04N 5/225* (2006.01)
*H04N 9/73* (2006.01)

(56) References Cited

U.S. PATENT DOCUMENTS

| | | |
|---|---|---|
| 2011/0141241 A1 | 6/2011 | Lee et al. |
| 2011/0298710 A1* | 12/2011 | Ruckhaeberle ....... G06F 3/0346 345/158 |
| 2012/0194728 A1* | 8/2012 | Kim ......................... G02B 3/00 348/342 |
| 2014/0063229 A1* | 3/2014 | Olsson ................. H04N 5/2252 348/84 |
| 2014/0085533 A1* | 3/2014 | Celia ........................ G03B 5/00 348/369 |
| 2014/0148220 A1 | 5/2014 | Park et al. |
| 2014/0313316 A1* | 10/2014 | Olsson ................... H04N 7/183 348/84 |

* cited by examiner

CAMERA APPARATUS FOR AUTOMATICALLY MAINTAINING HORIZONTALITY AND METHOD FOR THE SAME

CROSS REFERENCE TO RELATED APPLICATIONS

This application claims the benefit of Korean Patent Application No. 10-2015-0007877, filed Jan. 16, 2015, No. 10-2015-0007878, filed Jan. 16, 2015, and No. 10-2015-0143780, filed Oct. 15, 2015, which are hereby incorporated by reference in their entirety into this application.

BACKGROUND OF THE INVENTION

1. Technical Field

The present invention relates to a camera apparatus for automatically maintaining horizontality and a method for the same.

2. Description of the Related Art

Recently, as smart phones and video cameras have come to be widely used, camera modules for these devices have also come to be widely used. A camera module is a part for acquiring images in a digital camera or a video camera, and is a component that includes a lens, a filter, an image sensor, and the like.

When a still image or video is captured using a smart phone or video camera equipped with a camera module, because it is quite difficult to keep the device horizontal, the captured image or video may be tilted. When this image or video is displayed on other devices, a user may feel uncomfortable while viewing it.

Particularly, when such an image or video is transmitted from a smart phone and is displayed on a TV, because it is impossible to hold the TV at an angle to restore horizontality, viewers have no choice but to view a tilted image.

Also, if a camera is not leveled while capturing a panoramic image, it is difficult to obtain a clear image. In order to solve this problem, solutions for restoring the horizontality of a scene in the software domain have been released. However, restoring horizontality using software may result in deterioration of image quality or reduced image size.

Alternatively, there is a method for mechanically moving the entire camera or video camera to keep it horizontal. However, because this method requires a large and heavy device for maintaining horizontality, it is difficult to apply to smart phones or small video cameras for portable use.

In order to solve this problem, that is, in order to maintain horizontality without deterioration in image quality, a technical method in which a camera module automatically maintains horizontality is necessary.

SUMMARY OF THE INVENTION

An object of the present invention is to keep a camera module horizontal in order to capture a still image or video in which horizontality is stably maintained even if the smart phone or video camera equipped with the camera module is shaken.

Another object of the present invention is to facilitate the capture of a clear panoramic image by keeping a camera module horizontal without any additional device for maintaining horizontality.

In order to accomplish the above object, a camera apparatus for automatically maintaining horizontality according to the present invention includes: a camera module including a camera lens, a filter, and an image sensor; a horizontal sensor for sensing a positional state corresponding to the image sensor; a horizontal control signal generation unit for generating a horizontal control signal using a result of comparing the positional state with a reference state; and a horizontal control device for rotating the camera module based on the horizontal control signal and controlling the camera module to stay horizontal.

The horizontal sensor may comprise one or more of a gyroscope sensor, a gravity sensor, and an acceleration sensor.

The horizontal control device may determine a direction of rotation of the camera module based on the horizontal control signal, and rotate the camera module in the direction using a servomotor.

The horizontal control device may determine an angle of rotation of the camera module based on the horizontal control signal, and rotate the camera module by the angle using a step motor.

The angle by which the horizontal control device may rotate the camera module ranges from −180 degrees to 180 degrees.

The camera module includes a graduated filter, and the horizontal control device may rotate both the graduated filter and the camera module in an identical direction by an identical angle based on the horizontal control signal.

The camera module may include a stray light removal unit for controlling an image circle according to a size and shape of the image sensor.

Also, a camera apparatus according to an embodiment of the present invention includes: a camera module including a camera lens, a filter, and an image sensor; a horizontal sensor for sensing a positional state corresponding to the image sensor; a horizontal control signal generation unit for generating a horizontal control signal using a result of comparing the positional state with a reference state; and a horizontal control device for rotating the image sensor of the camera module based on the horizontal control signal and controlling the image sensor to stay horizontal.

The horizontal sensor may comprise one or more of a gyroscope sensor, a gravity sensor, and an acceleration sensor.

The horizontal control device may determine a direction of rotation of the image sensor based on the horizontal control signal, and rotate the image sensor in the direction using a servomotor.

The horizontal control device may determine an angle of rotation of the image sensor based on the horizontal control signal, and rotate the image sensor by the angle using a step motor.

The angle by which the horizontal control device may rotate the image sensor ranges from −180 degrees to 180 degrees.

The horizontal control device may be connected to the image sensor using an electromagnetic method.

Also, a method for maintaining horizontality of a camera module includes: sensing, by a horizontal sensor, a horizontal state of an image sensor; generating, by a horizontal control signal generation unit, a horizontal control signal based on a result of comparing the horizontal state with a reference state; and rotating, by a horizontal control device, any one of the camera module and the image sensor based on the horizontal control signal in order to attain horizontality, and controlling any one of the camera module and the image sensor to stay horizontal.

Generating the horizontal control signal may be configured to generate the horizontal control signal that includes one or more of a direction of rotation and an angle of rotation of any one of the camera module and the image sensor.

Controlling any one of the camera module and the image sensor to stay horizontal may be configured to determine a direction of rotation of any one of the camera module and the image sensor based on the horizontal control signal, and to rotate any one of the camera module and the image sensor in the direction using a servomotor.

Controlling any one of the camera module and the image sensor to stay horizontal may be configured to determine an angle of rotation of any one of the camera module and the image sensor based on the horizontal control signal, and to rotate any one of the camera module and the image sensor by the angle using a step motor.

Controlling any one of the camera module and the image sensor to stay horizontal may be configured to rotate both a graduated filter and the camera module in an identical direction by an identical angle based on the horizontal control signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
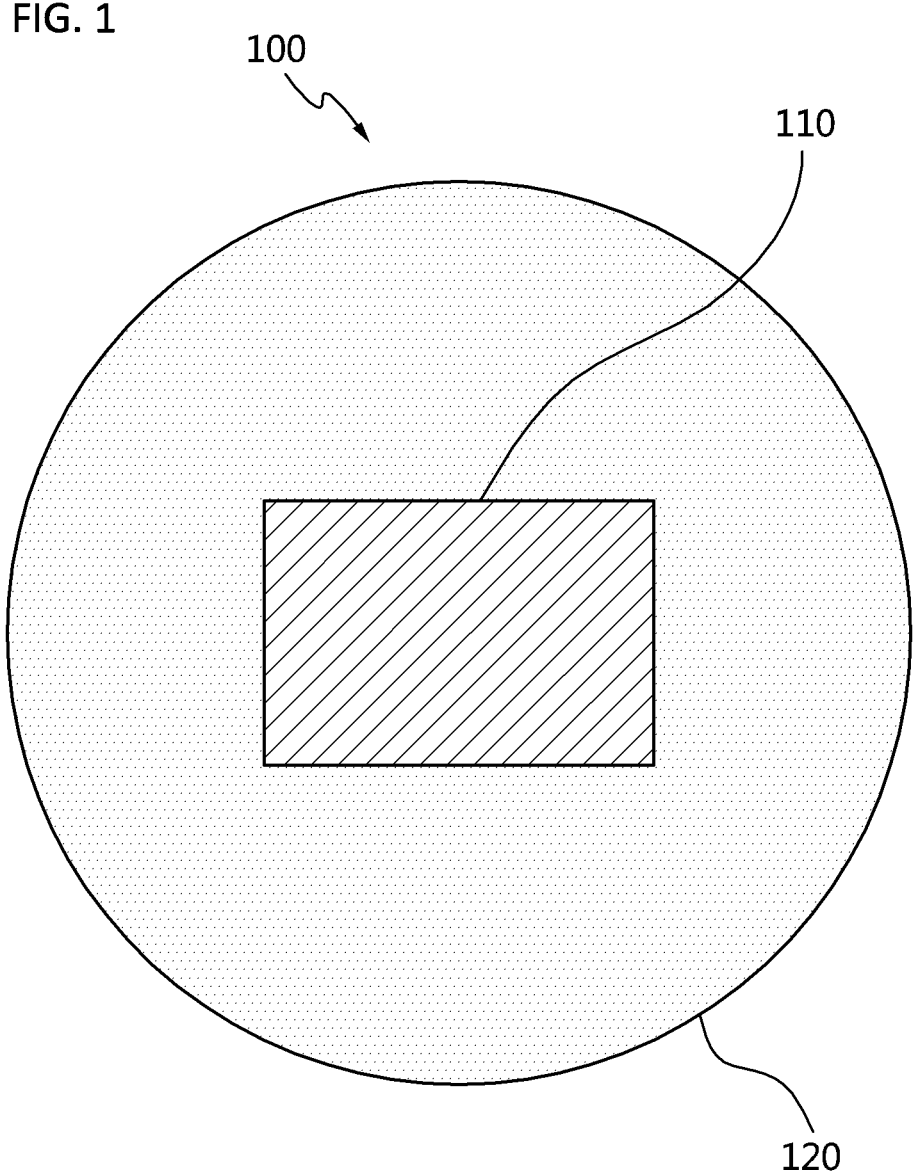
FIGS. 1 and 2 are concept diagrams of a camera module (elevation views) for describing an embodiment of the present invention.

Specific structural or functional descriptions in the embodiments of the present invention disclosed in the specification should not be construed as limiting the invention, and are only for description of the embodiments of the present invention, which can be embodied in various forms.

Specific exemplary embodiments are illustrated in the drawings and described in detail in the specification or application because the embodiments of the present invention may have various forms and modifications. It should be understood, however, that there is no intent to limit the embodiments of the present invention to the specific embodiments, but the intention is to cover all modifications, equivalents, and alternatives included to the scope of the present invention.

Although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a" and "an" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an elevation view of a camera module for describing an embodiment of the present invention.

Referring to FIG. 1, a camera module 100 may include a lens 120, an image sensor 110, an actuator (not illustrated) for focusing on a subject, a low-pass filter (not illustrated) for anti-aliasing, a photometric module (not illustrated) for measuring brightness and distribution thereof in the scene to be captured, and the like, but the present invention illustrates a camera module 100 that includes only a lens 120 and an image sensor 110, for brevity of description.

Figure 2:
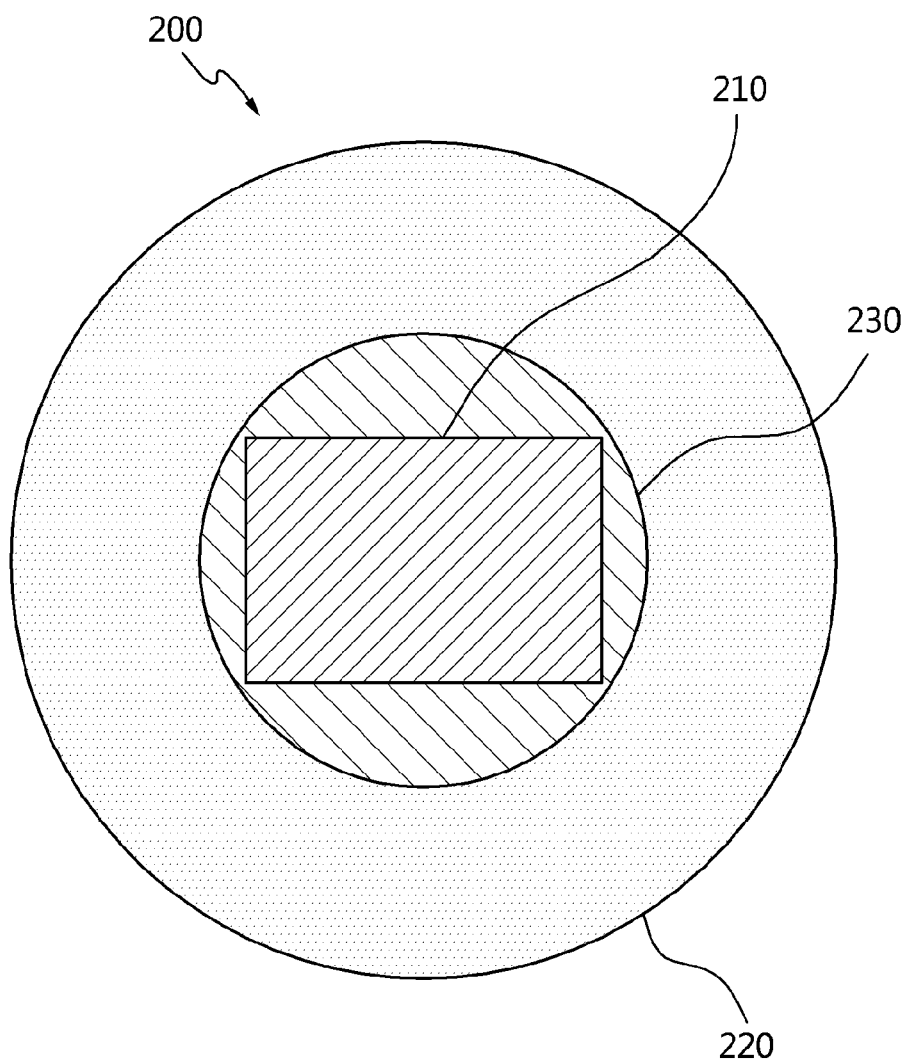

FIG. 2 is an elevation view of a camera module for describing an embodiment of the present invention.

Referring to FIG. 2, a camera module 200 may include a lens 220, an image sensor 210, a rotary plate 230 to which the image sensor is affixed, an actuator (not illustrated) for focusing on a subject, a low-pass filter (not illustrated) for anti-aliasing, a photometric module (not illustrated) for measuring brightness and distribution thereof in a scene to be captured, and the like, but the present invention illustrates a camera module 200 that includes only a lens 220, an image sensor 210, and a rotary plate 230 for brevity of description.

The difference between the camera modules illustrated in FIGS. 1 and 2 is whether the camera module includes the rotary plate 230.

In the case of FIG. 1, the camera module rotates, whereas in the case of FIG. 2, the image sensor rotates, and the rotary plate 230 is used to rotate the image sensor. However, if the image sensor 21 can rotate without the rotary plate 230, the rotary plate 230 may be omitted.

Figure 3:
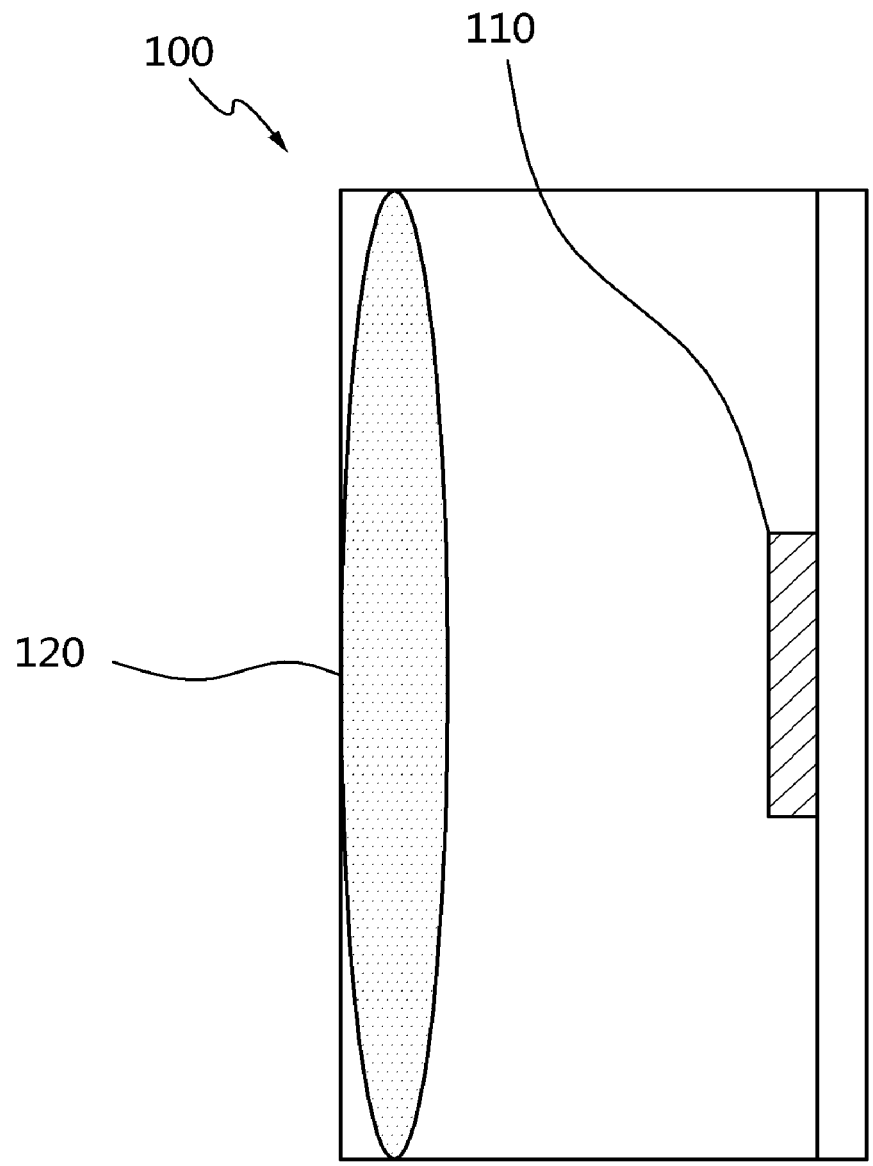
FIGS. 3 and 4 are concept diagrams of a camera module (lateral views) for describing an embodiment of the present invention.

FIG. 3 is a lateral view of a camera module for describing an embodiment of the present invention.

Referring to FIG. 3, the lens 120 of a camera module 100 may comprise either a single lens or multiple lenses. Also, the lens may include a mirror and a reflective lens. The image sensor 110 may use a CMOS image sensor that uses a complementary metal-oxide-semiconductor, a CCD image sensor that uses a charge-coupled device, or another image sensor similar to these sensors.

Figure 4:
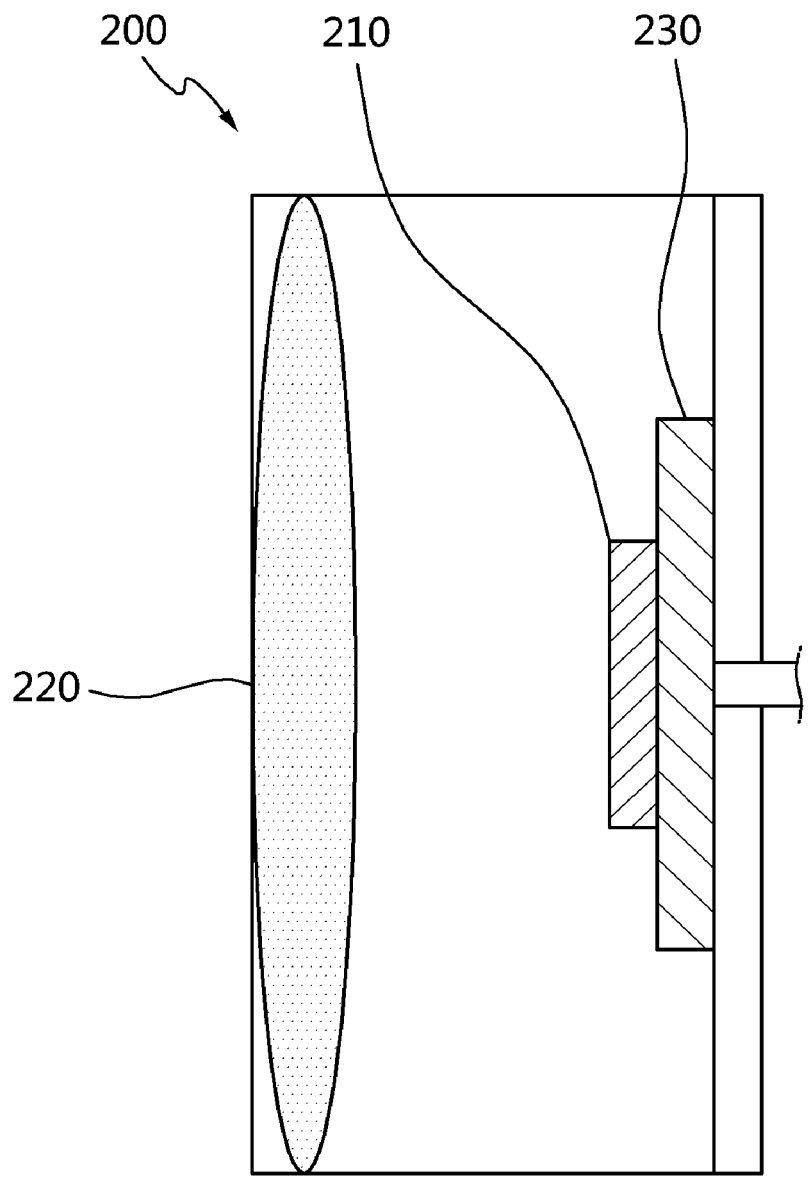

FIG. 4 is a lateral view of a camera module for describing an embodiment of the present invention.

Referring to FIG. 4, the lens 220 of a camera module 200 may comprise either a single lens or multiple lenses. Also, the lens may include a mirror and a reflective lens. The image sensor 210 may use a CMOS image sensor that uses a complementary metal-oxide-semiconductor, a CCD image sensor that uses a charge-coupled device, or another image sensor similar to these sensors.

FIG. 4 is a view in which a rotary plate 230 is added to the configuration of FIG. 3. As described above, if the image sensor 210 can rotate without the rotary plate 230, the rotary plate 230 may be omitted.

Figure 5:
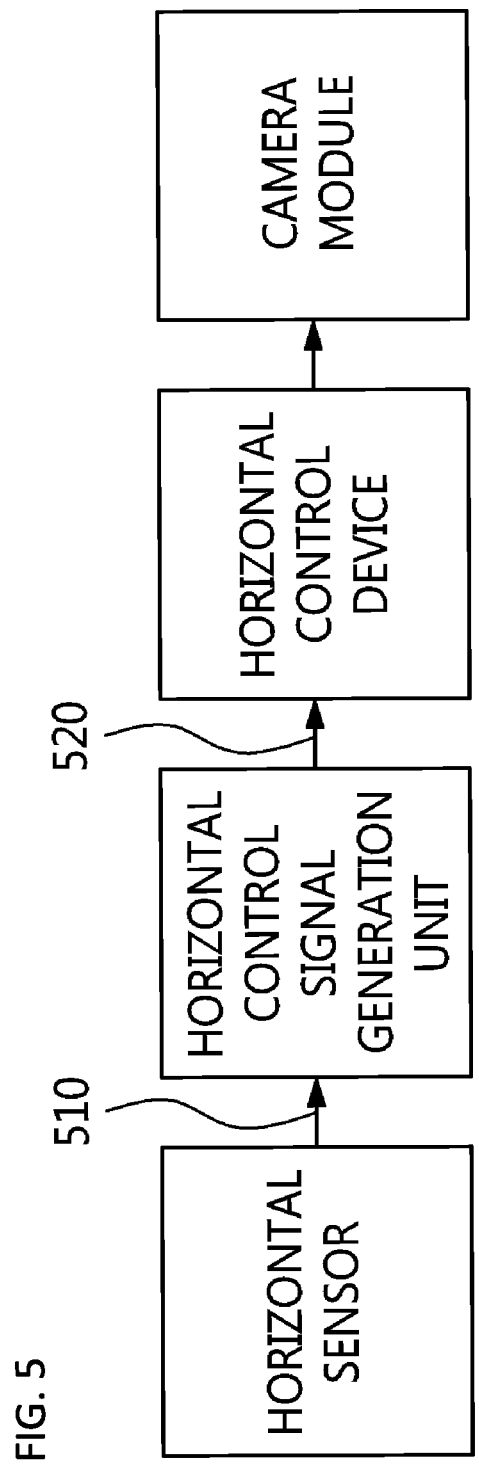
FIG. 5 is a concept diagram of a camera apparatus for automatically maintaining horizontality according to an embodiment of the present invention.

FIG. 5 is a concept diagram of a camera apparatus for automatically maintaining horizontality according to an embodiment of the present invention.

Referring to FIG. 5, a horizontal sensor may comprise a gyroscope sensor, a gravity sensor, or an acceleration sensor. The horizontal sensor may be affixed to the image sensor 110 or the camera module 100. The horizontal sensor generates horizontal sensor data 510, which is information about the direction of the image sensor 110 tilting relative to a reference state (horizontal state) or information about both the direction and angle of the image sensor 110 tilting relative to the reference state, and transmits the horizontal sensor data 510 to a horizontal control signal generation unit.

The horizontal control signal generation unit generates a horizontal control signal 520 based on the horizontal sensor data 510.

In this case, if the horizontal sensor data 510 is information about the direction and angle of the camera module 100 tilting relative to the reference state (i.e. the horizontal state), the horizontal control signal generation unit transmits a horizontal control signal 520 to cause the camera module 100 to rotate in the direction opposite to the direction thereof by the tilting angle.

In this case, if the horizontal sensor data 510 is information about the direction and angle of the image sensor 110 tilting relative to the reference state (horizontal state), the horizontal control signal generation unit transmits a horizontal control signal 520 to cause the image sensor 110 to rotate in the direction opposite to the direction thereof by the tilting angle.

On the other hand, if the horizontal sensor data 510 includes information only about the direction of the tilting camera module 100, the horizontal control signal generation unit transmits a horizontal control signal 520 in order to rotate the camera module 100 in the direction opposite to the direction thereof by a given angle. In this case, based on negative feedback, the horizontal control signal 520 adjusts the degree of tilt of the camera module 100 to rotate the camera module 100 in the opposite direction, whereby the camera module 100 may stay horizontal.

Also, if the horizontal sensor data 510 includes information only about the direction of the tilting image sensor 110, the horizontal control signal generation unit transmits a horizontal control signal 520 to rotate the image sensor 110 in the direction opposite to the direction thereof by a given angle. In this case, based on negative feedback, the horizontal control signal 520 adjusts the degree of tilt of the image sensor 110 to rotate the image sensor 110 in the opposite direction, whereby the image sensor 110 may stay horizontal.

Figure 6:
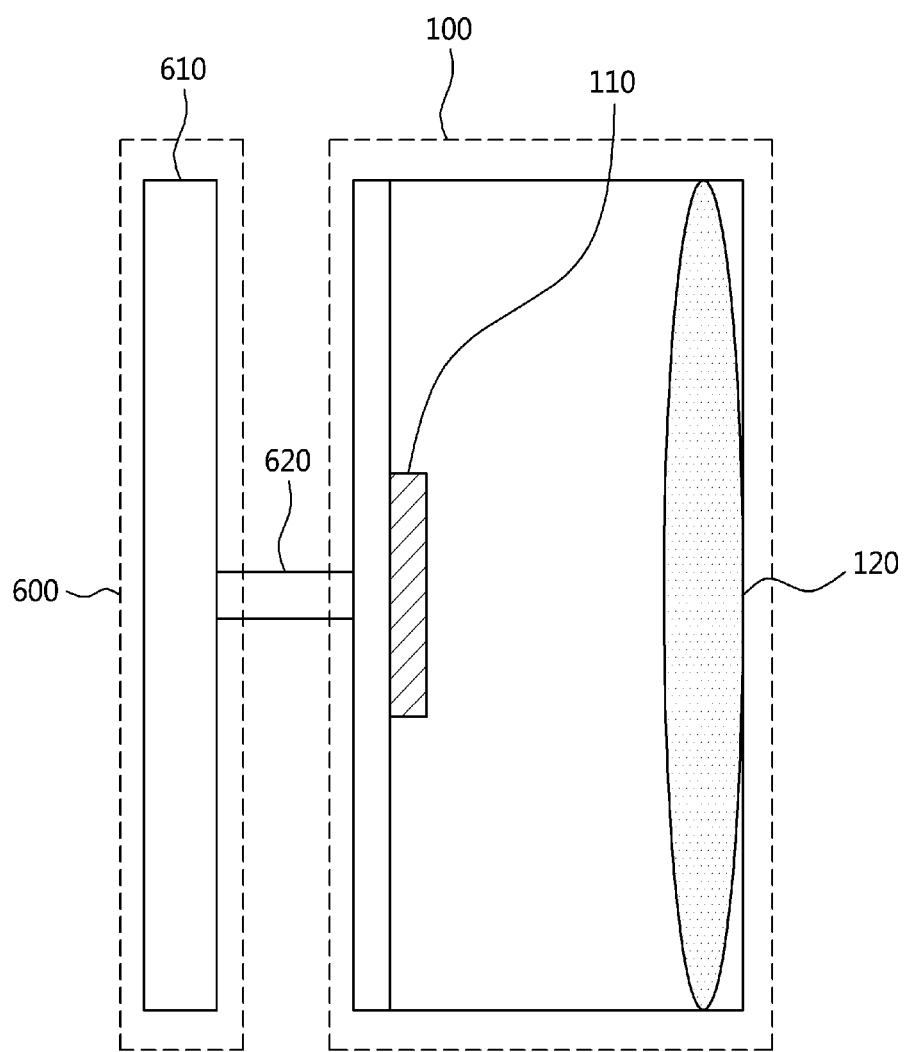
FIGS. 6 and 7 are concept diagrams illustrating the connection between a horizontal control device and a camera module according to an embodiment of the present invention.

FIG. 6 is a concept diagram illustrating the connection between a horizontal control device and a camera module according to an embodiment of the present invention.

Referring to FIG. 6, the camera module 100 is connected to a step motor 610, which is an embodiment of the horizontal control device 600, through the shaft 620 of the step motor.

Here, the horizontal control device 600 comprises the step motor 610, but any horizontal control device capable of rotating the camera module 100 depending on the horizontal control signal, such as a servomotor, may be used.

If the horizontal control signal includes information about the tilting angle, it is desirable to use a step motor, which is advantageous in that it offers accurate control of a rotation angle.

If the horizontal control signal includes information only about the tilting direction and feedback control is used accordingly, it is desirable to use a servomotor.

Also, in FIG. 6, the step motor 610 and the camera module 100 are physically connected to each other through the shaft 620 of the step motor, but without limitation to this example, the camera module 100 and the horizontal control device 600 may be electromagnetically connected to each other.

Figure 7:
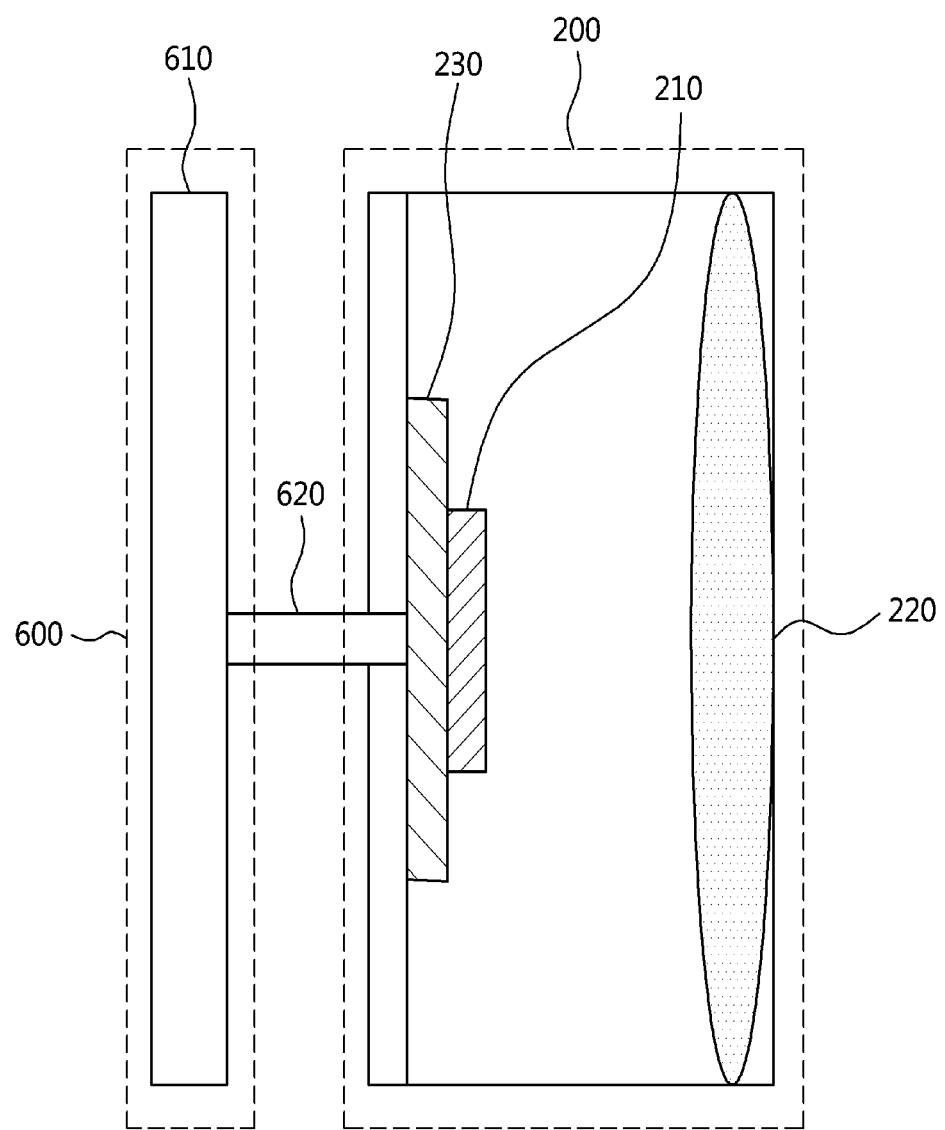

FIG. 7 is a concept diagram illustrating the connection between a horizontal control device and an image sensor according to an embodiment of the present invention.

Referring to FIG. 7, the image sensor 210 is affixed to a rotary plate 230, and the rotary plate 230 is connected to a step motor 610, which is an embodiment of the horizontal control device 600, through the shaft 620 of the step motor. Here, the horizontal control device 600 comprises the step motor 610, but any horizontal control device capable of rotating the rotary plate 230 depending on the horizontal control signal, such as a servomotor, may be used.

If the horizontal control signal includes information about the tilting angle, it is desirable to use a step motor, which is advantageous in that it offers accurate control of a rotation angle.

If the horizontal control signal includes information only about the tilting direction and feedback control is used accordingly, it is desirable to use a servomotor.

Also, in FIG. 7, the step motor 610 and the rotary plate 230, to which the image sensor 210 is affixed, are physically connected to each other through the shaft 620 of the step motor, but without limitation to this example, the rotary plate 230 and the horizontal control device 600 may be electromagnetically connected to each other.

Also, if, without the rotary plate 230, the horizontal control device 600 may rotate the image sensor 210 depending on the horizontal control signal, the rotary plate 230 may be omitted.

Figure 8:
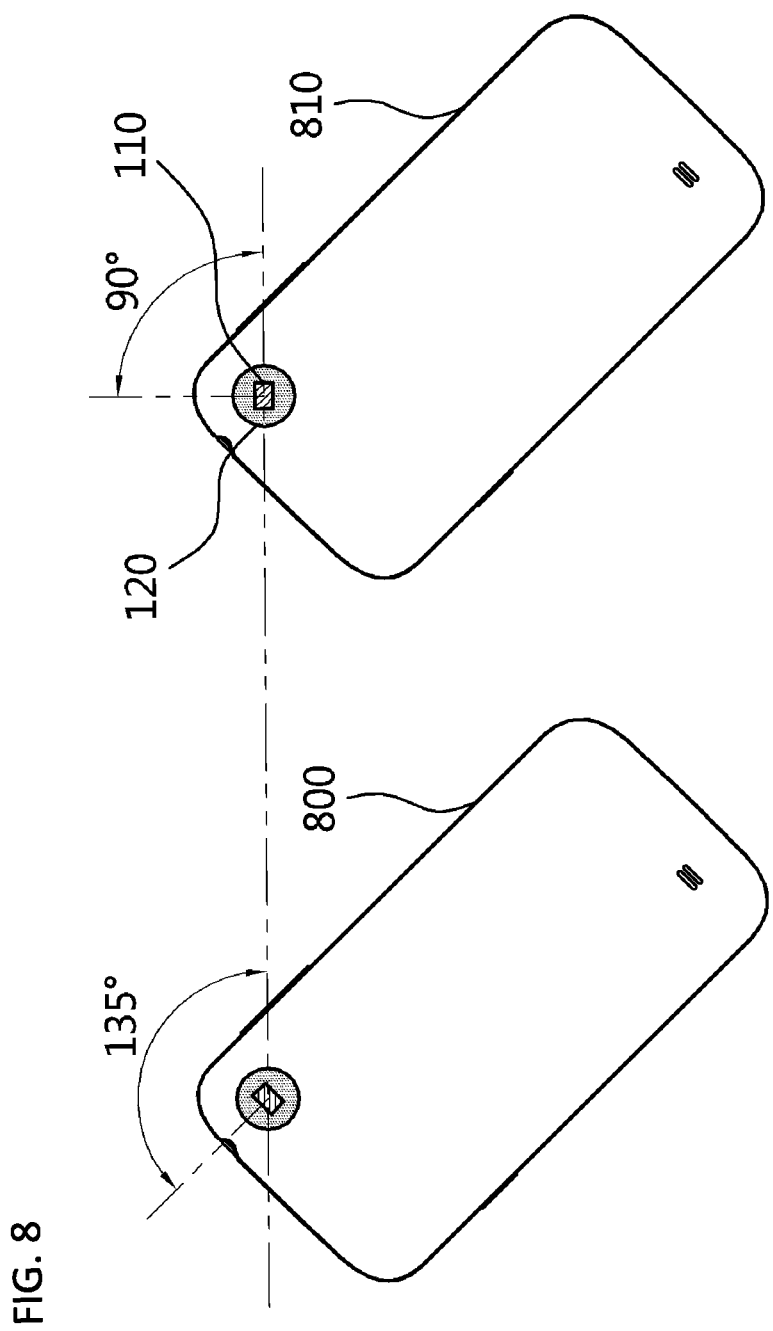
FIG. 8 is a concept diagram illustrating a function of maintaining the horizontality of a camera module according to an embodiment of the present invention.

FIG. 8 is a concept diagram illustrating a function of maintaining the horizontality of a camera module according to an embodiment of the present invention.

Referring to FIG. 8, when a smart phone 800, equipped with an existing camera, tilts 45 degrees to the left relative to a horizontal line, the image sensor of a camera module also tilts 45 degrees to the left. However, in the case of a smart phone 810 equipped with the camera apparatus for automatically maintaining horizontality, the image sensor 110 of the camera module 100 stays horizontal even if the smart phone 810 tilts 45 degrees to the left.

Figure 9:
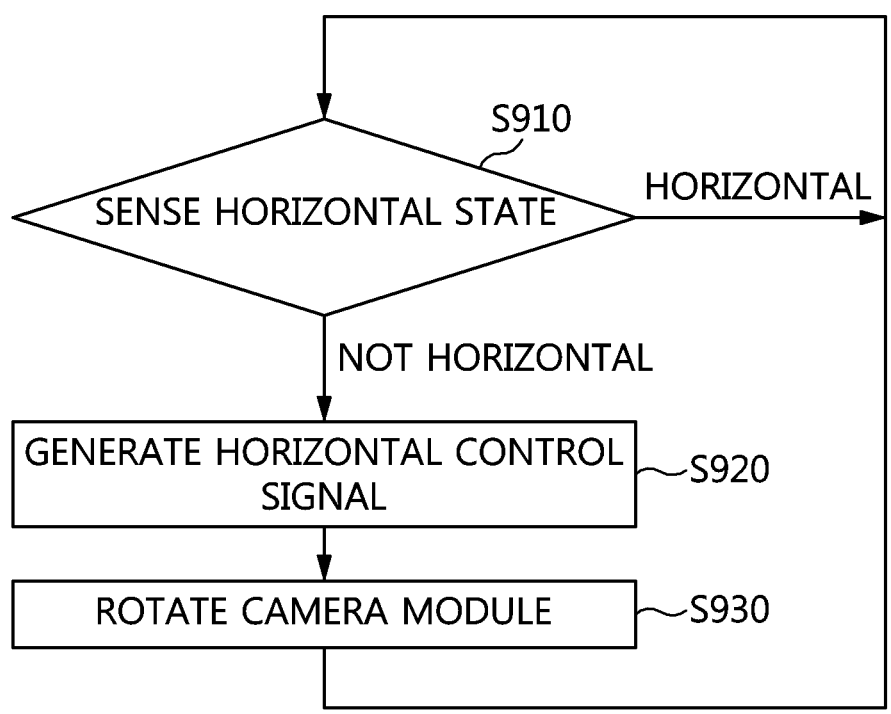
FIG. 9 is a flowchart describing a method in which a camera module maintains horizontality according to an embodiment of the present invention.

FIG. 9 is a flowchart describing a method in which a camera module maintains horizontality according to an embodiment of the present invention.

Referring to FIG. 9, in the method of the operation of a camera apparatus for automatically maintaining horizontality according to an embodiment of the present invention, a horizontal sensor senses whether an image sensor stays horizontal at step S910.

In this case, the horizontal sensor generates data concerning the horizontal state of the image sensor, and transmits the data concerning the horizontal state to a horizontal control signal generation unit. The data concerning the horizontal state may be either the direction of the image sensor tilting relative to the horizon or the direction and angle of the image sensor tilting relative to the horizon.

Also, the horizontal control signal generation unit generates a horizontal control signal at step S920.

In this case, the horizontal control signal generation unit generates the horizontal control signal corresponding to the data concerning the horizontal state, and transmits the signal to a horizontal control device.

For example, if the data concerning the horizontal state includes only the tilting direction, the horizontal control signal may be a feedback control signal for driving a servomotor.

If the data concerning the horizontal state includes both the tilting direction and angle, the horizontal control signal may be a Pulse Width Modulation (PWM) signal for driving a step motor.

Also, the horizontal control device rotates the camera module at step S930.

In this case, if the data concerning the horizontal state includes only the tilting direction and the horizontal control signal is a feedback control signal for driving a servomotor, the servomotor, which is the horizontal control device, moves in the direction opposite to the direction of the titling image sensor, and the horizontal sensor senses the movement. Accordingly, the corresponding process is repeated until the image sensor attains a horizontal state.

On the other hand, if the data concerning the horizontal state includes both the tilting direction and angle and the horizontal control signal is a PWM signal for driving a step motor, the step motor, which is the horizontal control device, rotates in the direction opposite to the direction of the tilting image sensor by the tilting angle, whereby the image sensor attains a horizontal state.

Meanwhile, a graduated filter may be effectively used for capturing a subject with extreme exposure differences, such as in landscape photography. However, because the direction of graduation is determined, a capture unit is not allowed to rotate if the graduated filter is not fixed thereto.

However, because the present invention rotates the whole camera module 100 in order to stay horizontal, regardless of whether the graduated filter is installed inside the camera module 100 or outside the camera module 100, the graduated filter rotates along with the camera module 100. Therefore, there is no limitation on rotation of the graduated filter, and it is effective in exposure control when capturing panoramic images.

When the image sensor 110 of the camera module 100 has a rectangular form rather than a square, a petal hood, a partition wall having rectangular holes, or a component having an effect similar to that of the partition wall may minimize vignetting, which is a reduction of the brightness of an image at the periphery, and maximally prevent unintended stray light from entering a lens.

However, in this case, because an image circle, which is an image focused through a lens, is converted into a rectangular form other than a circular form, there is a disadvantage in that an unintended rotation may cause excessive vignetting.

In the camera apparatus according to an embodiment of the present invention, if a component for reducing stray light is physically fixed to the camera module 100 to rotate therewith, stray light may be effectively eliminated. As a result, not only may ghosting and lens flare be suppressed, but images may also be captured while staying horizontal.

Figure 10:
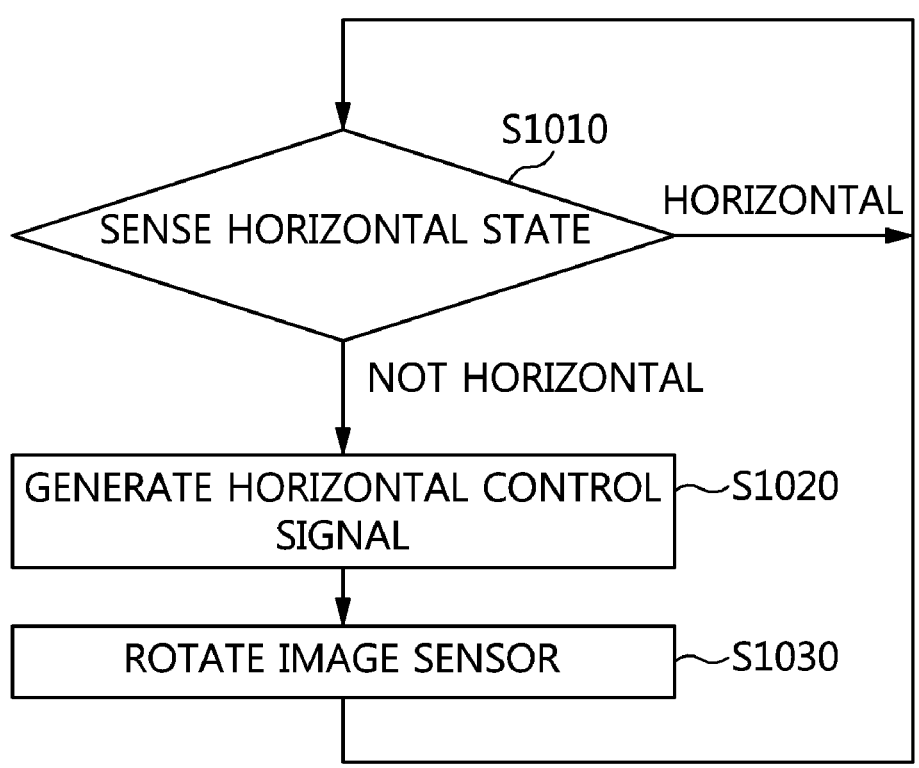
FIG. 10 is a flow chart describing a method in which an image sensor maintains horizontality according to an embodiment of the present invention.

FIG. 10 is a flow chart describing a method in which an image sensor maintains horizontality according to an embodiment of the present invention.

Referring to FIG. 10, in the method of the operation of a camera apparatus for automatically maintaining the horizontality of an image sensor according to an embodiment of the present invention, a horizontal sensor senses whether an image sensor stays horizontal at step S1010.

In this case, the horizontal sensor generates data concerning the horizontal state and transmits the data to a horizontal control signal generation unit. The data concerning the horizontal state may be either the direction of the image sensor tilting relative to the horizon or the direction and angle of the image sensor tilting relative to the horizon.

Also, the horizontal control signal generation unit generates a horizontal control signal at step S1020.

In this case, the horizontal control signal generation unit generates the horizontal control signal corresponding to the data concerning the horizontal state and transmits the signal to a horizontal control device.

For example, if the data concerning the horizontal state includes only the tilting direction, the horizontal control signal may be a feedback control signal for driving a servomotor.

If the data concerning the horizontal state includes both the tilting direction and angle, the horizontal control signal may be a Pulse Width Modulation (PWM) signal for driving a step motor.

Also, the horizontal control device rotates the image sensor at step S1030.

In this case, if the data concerning the horizontal state includes only the tilting direction and the horizontal control signal is a feedback control signal for driving a servomotor, the servomotor, which is the horizontal control device, moves in the direction opposite to the direction of the titling image sensor, and the horizontal sensor senses the movement. Accordingly, the corresponding process is repeated until the image sensor attains a horizontal state.

On the other hand, if the data concerning the horizontal state includes the tilting direction and angle and the horizontal control signal is a PWM signal for driving a step motor, the step motor, which is the horizontal control device, rotates in the direction opposite to the direction of the tilting image sensor by the tilting angle, whereby the image sensor attains a horizontal state.

According to the present invention, because a camera module stays horizontal, it is possible to capture a still image or video in which horizontality is stably maintained even if the smart phone or video camera equipped with the camera module is shaken.

Also, according to the present invention, a clear panoramic image may be captured by maintaining the horizontality of a camera module, without any additional device for maintaining horizontality.

Although the preferred embodiments of the present invention have been disclosed for illustrative purposes, those skilled in the art will appreciate that various modifications, additions and substitutions are possible. Therefore, the technical scope of the present invention should be defined by the technical spirit of the claims.

What is claimed is:

1. A camera apparatus, comprising:
  a camera module including a camera lens, a filter, and an image sensor;
  a horizontal sensor for sensing a positional state corresponding to the camera module;
  a horizontal control signal generation unit for generating a horizontal control signal using a result of comparing the positional state with a reference state; and
  a horizontal control device for rotating the camera module based on the horizontal control signal and controlling the camera module to stay horizontal,
  wherein when the horizontal sensor generates data including information only about a direction of rotation of the camera module tilting relative to the reference state, the horizontal control signal generation unit generates the horizontal control signal in order to drive the horizontal control device to rotate the camera module in a direction opposite to the direction of rotation of the camera module by a given angle, and
  wherein when the horizontal sensor generates data including information about the direction of rotation of the camera module and an angle of rotation of the camera module tilting relative to the reference state, the horizontal control signal generation unit generates the horizontal control signal in order to drive the horizontal control device to rotate the camera module in a direction opposite to the direction of rotation of the camera module by the angle of rotation of the camera module.

2. The camera apparatus of claim 1, wherein the horizontal sensor comprises one or more of a gyroscope sensor, a gravity sensor, and an acceleration sensor.

3. The camera apparatus of claim 1, wherein the horizontal control device determines the direction of rotation of the camera module based on the horizontal control signal, and rotates the camera module in the direction opposite to the direction of rotation of the camera module using a servomotor.

4. The camera apparatus of claim 1, wherein the horizontal control device determines the angle of rotation of the camera module based on the horizontal control signal, and rotates the camera module in the direction opposite to the direction of rotation of the camera module by the angle of rotation of the camera module using a step motor.

5. The camera apparatus of claim 4, wherein the angle of rotation by which the horizontal control device rotates the camera module ranges from -180 degrees to 180 degrees.

6. The camera apparatus of claim 1, wherein the horizontal control device is physically connected to the camera module.

7. The camera apparatus of claim 1, wherein the camera module comprises a graduated filter, and
  the horizontal control device rotates both the graduated filter and the camera module in an identical direction by an identical angle based on the horizontal control signal.

8. The camera apparatus of claim 1, wherein the camera module comprises a stray light removal unit for controlling an image circle according to a size and shape of the image sensor.

9. A camera apparatus, comprising:
  a camera module including a camera lens, a filter, and an image sensor;
  a horizontal sensor for sensing a positional state corresponding to the image sensor;
  a horizontal control signal generation unit for generating a horizontal control signal using a result of comparing the positional state with a reference state; and
  a horizontal control device for rotating the image sensor of the camera module based on the horizontal control signal and controlling the image sensor to stay horizontal,
  wherein when the horizontal sensor generates data including information only about a direction of rotation of the image sensor tilting relative to the reference state, the horizontal control signal generation unit generates the horizontal control signal in order to drive the horizontal control device to rotate the image sensor in a direction opposite to the direction of rotation of the image sensor by a given angle, and
  wherein when the horizontal sensor generates data including information about the direction of rotation of the image sensor and an angle of rotation of the image sensor tilting relative to the reference state, the horizontal control signal generation unit generates the horizontal control signal in order to drive the horizontal control device to rotate the image sensor in a direction opposite to the direction of rotation of the image sensor by the angle of rotation of the image sensor.

10. The camera apparatus of claim 9, wherein the horizontal sensor comprises one or more of a gyroscope sensor, a gravity sensor, and an acceleration sensor.

11. The camera apparatus of claim 10, wherein the horizontal control device determines the direction of rotation of the image sensor based on the horizontal control signal, and rotates the image sensor in the direction opposite to the direction of rotation of the image sensor using a servomotor.

12. The camera apparatus of claim 10, wherein the horizontal control device determines the angle of rotation of the image sensor based on the horizontal control signal, and rotates the image sensor in the direction opposite to the direction of rotation of the image sensor by the angle of rotation of the image sensor using a step motor.

13. The camera apparatus of claim 12, wherein the angle of rotation by which the horizontal control device rotates the image sensor ranges from -180 degrees to 180 degrees.

14. The camera apparatus of claim 9, wherein the horizontal control device is physically connected to the image sensor.

15. The camera apparatus of claim 9, wherein the horizontal control device is connected to the image sensor using an electromagnetic method.

16. A method for maintaining horizontality of a camera module and an image sensor, comprising:
  sensing, by a horizontal sensor, a horizontal state of any one of the camera module and an the image sensor;
  generating, by a horizontal control signal generation unit, a horizontal control signal based on a result of comparing the horizontal state with a reference state; and
  rotating, by a horizontal control device, any one of the camera module and the image sensor based on the horizontal control signal in order to attain horizontality, and controlling any one of the camera module and the image sensor to stay horizontal,
  wherein when the horizontal sensor generates data including information only about a direction of rotation of any one of the camera module and the image sensor tilting relative to the reference state, generating the horizontal control signal comprises generating the horizontal control signal in order to drive the horizontal control device to rotate any one of the camera module and the image sensor in a direction opposite to the direction of rotation of any one of the camera module and the image sensor by a given angle, and wherein when the horizontal sensor generates data including information about the direction of rotation and an angle of rotation of any one of the camera module and the image sensor tilting relative to the reference state, generating the horizontal control signal comprises generating the horizontal control signal in order to drive the horizontal control device to rotate any one of the camera module and the image sensor in a direction opposite to the direction of rotation of any one of the camera module and the image sensor by the angle of rotation of any one of the camera module and the image sensor.

17. The method of claim 16, wherein generating the horizontal control signal comprises generating the horizontal control signal that includes one or more of the direction of rotation and the angle of rotation of any one of the camera module and the image sensor.

18. The method of claim 17, wherein controlling any one of the camera module and the image sensor to stay horizontal comprises:

determining the direction of rotation of any one of the camera module and the image sensor based on the horizontal control signal; and rotating any one of the camera module and the image sensor in the direction opposite to the direction of rotation of any one of the camera module and the image sensor using a servomotor.

19. The method of claim 17, wherein controlling any one of the camera module and the image sensor to stay horizontal comprises:

determining the angle of rotation of any one of the camera module and the image sensor based on the horizontal control signal; and rotating any one of the camera module and the image sensor in the direction opposite to the direction of any one of the camera module and the image sensor by the angle of rotation using a step motor.

20. The method of claim 17, wherein controlling any one of the camera module and the image sensor to stay horizontal comprises rotating both a graduated filter and the camera module in an identical direction by an identical angle based on the horizontal control signal.

* * * * *